(12) United States Patent
Maheshwari et al.

(10) Patent No.: US 8,483,160 B2
(45) Date of Patent: Jul. 9, 2013

(54) FLEXIBLE MAP CODING FOR WIRELESS NETWORKS

(75) Inventors: Shashikant Maheshwari, Irving, TX (US); Yousuf Saifullah, Richardson, TX (US); Shu Shaw Wang, Arlington, TX (US); Haihong Zheng, Coppell, TX (US)

(73) Assignee: Nokia Siemens Networks Oy, Espoo (FI)

( * ) Notice: Subject to any disclaimer, the term of this patent is extended or adjusted under 35 U.S.C. 154(b) by 374 days.

(21) Appl. No.: 12/989,088

(22) PCT Filed: Apr. 23, 2009

(86) PCT No.: PCT/EP2009/054896
§ 371 (c)(1),
(2), (4) Date: Oct. 22, 2010

(87) PCT Pub. No.: WO2009/130280
PCT Pub. Date: Oct. 29, 2009

(65) Prior Publication Data
US 2011/0032900 A1 Feb. 10, 2011

Related U.S. Application Data

(60) Provisional application No. 61/047,418, filed on Apr. 23, 2008.

(51) Int. Cl.
*H04W 4/00* (2009.01)
*H04W 72/04* (2009.01)

(52) U.S. Cl.
USPC ............ 370/329; 370/312; 370/338; 375/267

(58) Field of Classification Search
USPC ........... 370/200–209, 312–338; 375/267–295
See application file for complete search history.

(56) References Cited

U.S. PATENT DOCUMENTS

| 7,664,087 | B2* | 2/2010 | Cho et al. ............... 370/338 |
| 8,131,297 | B2* | 3/2012 | Lee et al. ............... 455/437 |
| 2002/0090909 | A1* | 7/2002 | Dapper et al. ............ 455/3.01 |
| 2003/0066033 | A1* | 4/2003 | Direen et al. ............ 715/513 |
| 2006/0155946 | A1* | 7/2006 | Ji .................... 711/162 |
| 2007/0086419 | A1 | 4/2007 | Jang et al. ............... 370/347 |
| 2009/0154388 | A1* | 6/2009 | Jalloul et al. ............ 370/312 |
| 2012/0020329 | A1* | 1/2012 | Lee et al. ............... 370/331 |

FOREIGN PATENT DOCUMENTS

EP 1 679 932 A1 7/2006

OTHER PUBLICATIONS

XP-002539805, "802.16m Frame Structure Uplink Subframe Aggregation", Jan. 16, 2008, 10 pgs.

* cited by examiner

*Primary Examiner* — Afsar M Qureshi
(74) *Attorney, Agent, or Firm* — Harrington & Smith

(57) ABSTRACT

A method for transmitting, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer (NSP) that includes location information identifying a location of the next Map within a frame.

27 Claims, 3 Drawing Sheets

FLEXIBLE MAP CODING FOR WIRELESS NETWORKS

CROSS REFERENCE TO RELATED APPLICATION

This application is a 371 national stage application of International Application No. PCT/EP09/54896 dated Apr. 23, 2009, which claims priority on U.S. provisional patent application No. 61/047,418 filed Apr. 23, 2008.

TECHNICAL FIELD

This description relates to wireless networks.

BACKGROUND

In wireless networks, different techniques have been used to allocate various media resources to users. Some systems provide resource allocation to one or more mobile stations or wireless stations by transmission of a Map, which may sometimes include a downlink (DL) Map and an uplink (UL) Map. The Maps may sometimes include information elements to identify a wireless station or connection identifier (CID) and a resource (e.g., the symbols) allocated to the station or CID. A Map may include multiple IEs, to allocate resources (either UL or DL) for multiple or stations or CIDs. The Map may also indicate a physical transmission mode, such as a modulation rate and/or coding scheme (MCS) for the data burst or allocated resources. This may allow a base station to transmit data to different users or stations using different or varying MCSs that may be adjusted based on channel conditions for each station. However, the Map, which is transmitted to multiple wireless stations, is typically transmitted using a common physical transmission mode or MCS, which is often the most robust MCS that is used, to ensure that all stations can receive the Map. However, by using one MCS for transmission of all resource allocations, this may provide an inefficient use of media resource, at least in some cases. There has also been a proposal to transmit different MAPs to different stations. However, it may be desirable to improve the transmission of Maps or resource allocation information to wireless stations.

SUMMARY

According to an example embodiment, a method may include transmitting, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer that includes location information identifying a location of the next Map within a frame.

According to an example embodiment, an apparatus may include a controller; and a wireless transceiver coupled to the controller. The wireless transceiver may be configured to transmit, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer that includes location information identifying a location of the next Map within a frame.

According to an example embodiment, an apparatus may include a controller; and a wireless transceiver coupled to the controller. The wireless transceiver may be configured to transmit, to one or more wireless stations in a wireless network, map information identifying resources allocated to one or more of the wireless stations, the map information including a first Map and a plurality of sub Maps, the first Map and each Sub Map allocating resources to one or more of the wireless stations, the first Map and one or more of the Sub Maps including a Next Sub Map Pointer, the Next Sub Map Pointers being provided as a linked list, each Next Sub Map Pointer including location information identifying a location of the next Sub Map within a frame, a modulation rate and coding scheme (MCS) for the next Sub Map, and information identifying a connection or wireless station for which resources will be allocated in the Next sub Map.

According to another example embodiment, a method may include receiving a Map indicating an allocation of resources to a wireless station, decoding the received Map, determining a physical transmission mode for the Map based on the decoding of the Map, receiving data via the allocated resources as indicated by the decoded Map, decoding and/or demodulating the received data using a same physical transmission mode used to decode the received Map, wherein the same physical transmission mode is used to transmit both the Map and the received data.

According to another example embodiment, an apparatus may include a controller and a wireless transceiver. The apparatus may be configured to receive a Map indicating an allocation of resources to a wireless station, decode the received Map, determine a physical transmission mode for the Map based on the decoding of the Map, receive data via the allocated resources as indicated by the decoded Map, and decode and/or demodulate the received data using a same physical transmission mode used to decode the received Map, wherein the same physical transmission mode is used to transmit both the Map and the received data.

A method may include receiving a Map indicating an allocation of resources to a wireless station, performing a blind decoding the received Map, determining a modulation rate and/or coding scheme that was used for transmission of the Map based on the performing the blind decoding of the Map, receiving data via the allocated resources as indicated by the decoded Map, and decoding and/or demodulating the received data based on the same modulation rate and/or coding scheme that was used for transmission of the Map.

A method may include receiving a Map indicating an allocation of resources to a wireless station, the Map including a MCS (modulation rate and/or coding scheme) differential, decoding the received Map, determining a Map MCS that was used for transmission of the Map based on the decoding of the Map, receiving data via the allocated resources as indicated by the decoded Map, determining a data MCS for decoding and/or demodulating the received data based on the Map MCS and the MCS differential; and decoding and/or demodulating the received data using the data MCS.

According to another example embodiment, a method may include determining a MCS (modulation rate and/or coding scheme) differential; receiving a Map indicating an allocation of resources to a wireless station, decoding the received Map; determining a Map MCS that was used for transmission of the Map based on the decoding of the Map; receiving data via the allocated resources as indicated by the decoded Map; determining a data MCS for decoding and/or demodulating the received data based on the Map MCS and the MCS differential; and decoding and/or demodulating the received data using the data MCS.

According to another example embodiment, an apparatus may include a controller and a wireless transceiver. The apparatus may be configured to receive a Map indicating an allocation of resources to a wireless station, the Map including a MCS (modulation rate and/or coding scheme) differential; decode the received Map; determining a Map MCS that was used for transmission of the Map based on the decoding of the Map; receive data via the allocated resources as indicated by the decoded Map; determine a data MCS for decoding and/or demodulating the received data based on the Map MCS and the MCS differential; and decode and/or demodulate the received data using the data MCS.

According to another example embodiment, an apparatus may include a controller and a wireless transceiver. The apparatus may be configured to determine a MCS (modulation rate and/or coding scheme) differential; receive a Map indicating an allocation of resources to a wireless station, decode the received Map; determine a Map MCS that was used for transmission of the Map based on the decoding of the Map; receive data via the allocated resources as indicated by the decoded Map; determine a data MCS for decoding and/or demodulating the received data based on the Map MCS and the MCS differential; and decode and/or demodulate the received data using the data MCS.

The details of one or more implementations are set forth in the accompanying drawings and the description below. Other features will be apparent from the description and drawings, and from the claims.

DETAILED DESCRIPTION

Figure 1:
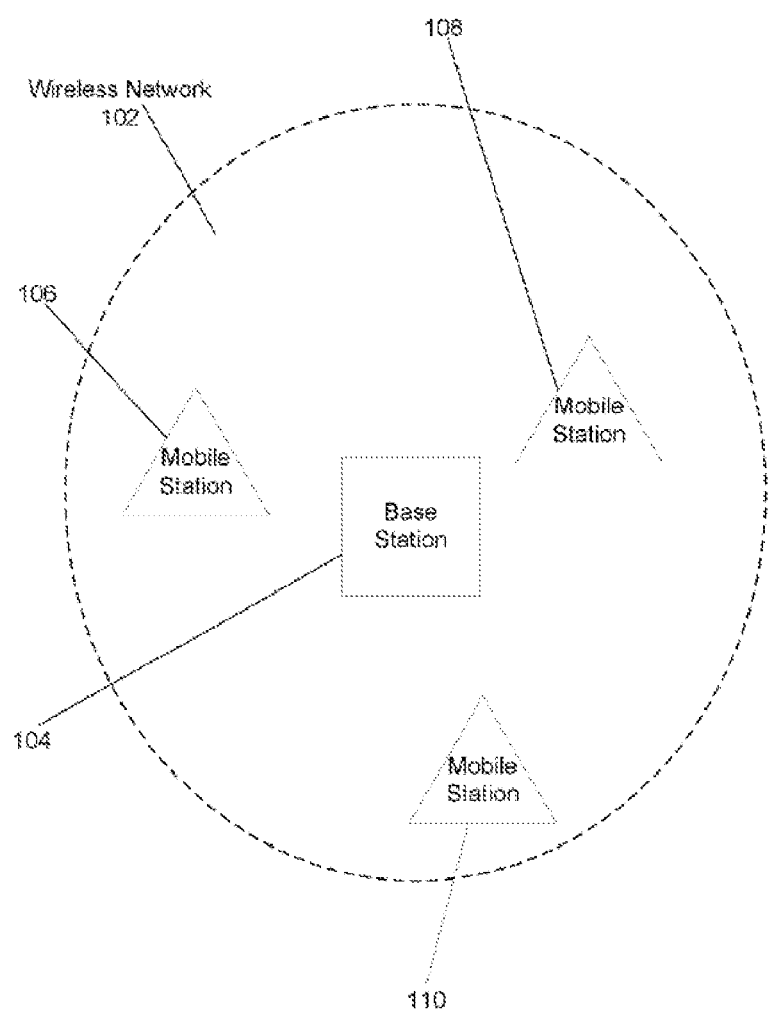
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards, aspects of the present disclosure may be applicable to any networking or wireless technologies.

Figure 2:
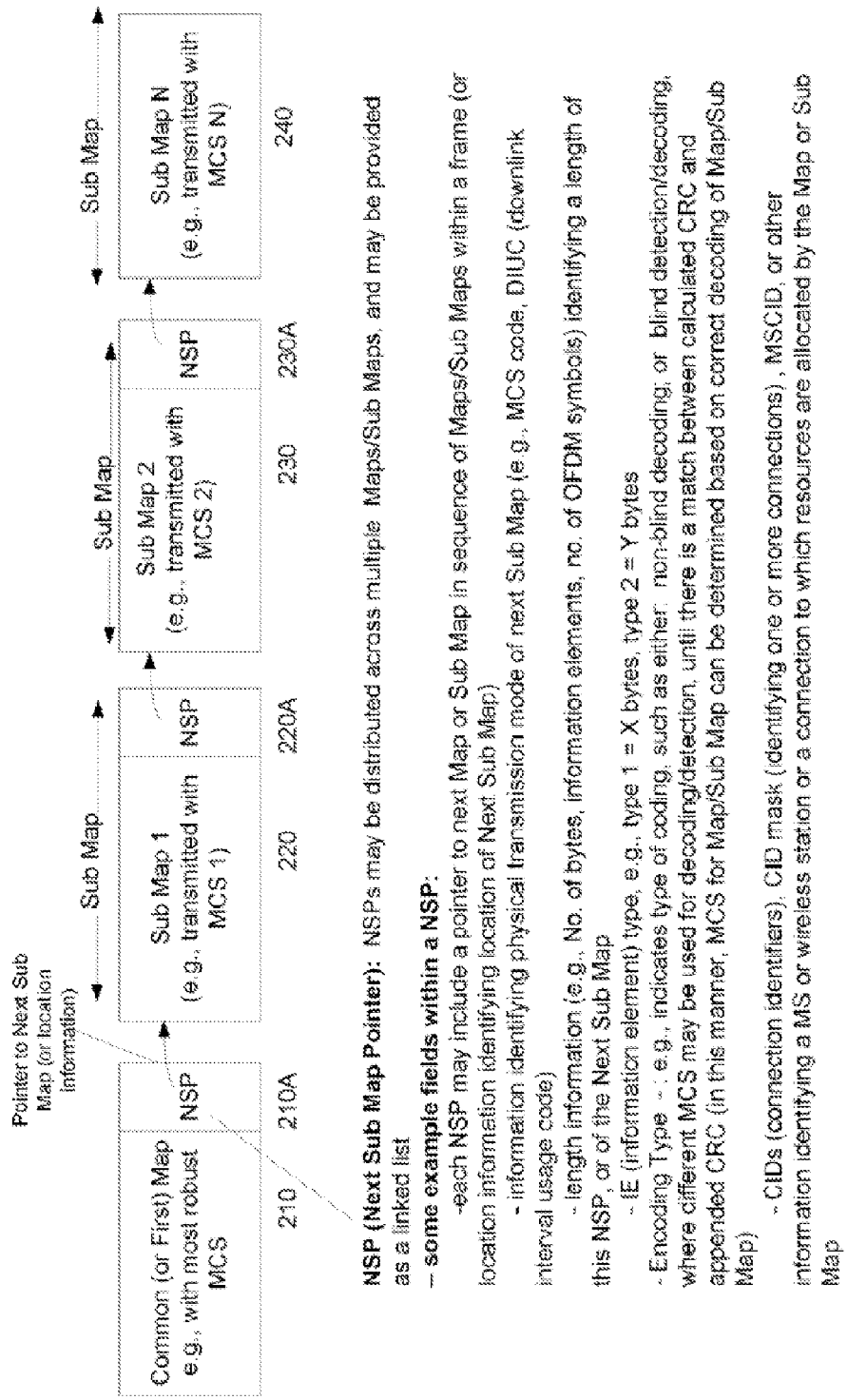
FIG. 2 is a diagram illustrating an example embodiment of a portion of a frame.

FIG. 2 is a diagram illustrating an example embodiment of a portion of a frame. The frame may include a DL sub-frame that includes map information, which may include a plurality of Maps, and DL data portion in which DL data may be transmitted to each station via allocated bursts or resources, for example. The frame may also include an UL subframe that may include resources (e.g., OFDM or OFDMA symbols) that may be allocated to allow one or more wireless stations to transmit UL to the base station, for example.

Rather than having one Map to allocate resources, the example embodiment shown in FIG. 2 may include a Map portion or Map information of a frame, which may include multiple Maps, such as a common or first Map, 210, Sub Map 1 220, Sub Map 2 230, . . . and Sub Map N 240. Any number of Maps, or Sub Maps may be provided. Each Map may allocate resources to one or more wireless stations (e.g., to mobile stations, wireless relay stations, or other wireless stations), or may communicate the allocation of these resources to wireless stations. For example, each Map or Sub Map may identify resources (e.g., a set of OFDM symbols, physical resource blocks or other resources), and identify a wireless station or connection identifier to which the resources are being allocated.

According to an example embodiment, each Map or Sub Map may be encoded or modulated using a flexible (e.g., different or variable) physical transmission mode, to allow for more efficient use of resources during Map transmission. Each physical transmission mode may include or use one or more different physical transmission parameters, such as modulation scheme, coding rate or FEC (forward error correction) type, etc. In an example embodiment, each Map or Sub Map may use a flexible or selectable or variable modulation scheme and/or coding rate, which may also be referred to as a modulation and coding scheme (MCS). Thus, a variable MCS may be used to modulate and/or encode each Map or Sub Map, e.g., based on the channel conditions for the wireless station to which the Map is directed. For example, a base station (BS) may select a MCS for transmitting each Map or Sub Map. For example, a first Map 210 may be transmitted using a most robust MCS, and each successive Sub Map, 220, 230, 240, . . . may be transmitted or modulated/encoded using a same or less robust MCS. For example, Sub Map 1 (220), Sub Map 2 (230) and Sub Map N (240) may be transmitted (e.g. modulated/encoded) using MCS 1, MCS 2 and MCS N, respectively.

In an example embodiment, the first (or common) Map 210 and one or more other Sub Maps may each include a Next Sub Map Pointer (NSP). For example, common Map 210 may include a NSP 210A, Sub Map 220 may include a NSP 220A, Sub Map 230 may include a NSP 230A, etc. A last Sub Map (e.g., sub Map 240 in this example) in a frame may not (necessarily) include a NSP, since there are no additional Sub Maps after the last Sub Map, for example. The NSPs may be distributed across multiple Maps or Sub Maps as shown in FIG. 2, and the NSPs may be provided as a linked list, for example.

Each NSP may include a number of fields. For example, each NSP may include a pointer to a next Sub Map (or location information identifying a location of a next Sub Map in the frame), e.g., as a symbol offset, number of bytes or other pointer or location information. For example, Sub Map 1 220 may be considered as the next Sub Map with respect to common Map 210; Sub Map 2 230 may be considered as the next Sub Map with respect to Sub Map 1 220; Sub Map N 240 may be considered as the next Sub Map with respect to Sub Map 3 240.

Each NSP may also include other fields, for example:
 information identifying a physical transmission mode for the next Sub Map, which may be identified via a MCS code, a DIUC (downlink interval usage code), or other code or information;

length information (e.g., no. of bytes, number of information elements or IEs, no. of OFDM symbols) identifying a length of this NSP or of the next Sub Map.

an IE type field (e.g., for blind detection)—indicating that the next Sub Map, or IEs in the next Sub Map are one of several types, such as one of several sizes, e.g., type 1=6 bytes, and type 2=12 bytes, as the sizes of IEs within the next Sub Map, for example;

Encoding or detection type—e.g., indicating either a) non-blind decoding/detecting where a MCS is provided to the receiving wireless station or is known by the receiving wireless station; the entire Sub Map may include a CRC and maybe a CID in the Map IE or b) blind detecting or decoding—in which the wireless station does not necessarily know the MCS for the Sub Map, and, for example, the NPS may not typically identify the MCS for the Sub Map. Therefore, for blind decoding/detecting, the wireless station receiver may attempt to decode the Sub Map (or each IE within sub Map) using different MCS; each time, a CRC is calculated and compared to the CRC provided at the end of the IE, and a match may typically indicate that a correct MCS was used for detection; also, for example, for blind decoding, each IE (each IE may allocate a resource to a station) in the Sub Map may include a CRC, and a CID is masked or XORed with the CRC to determine a CID for which the IE or Sub Map is directed.

information identifying one or more wireless stations or connections for which the Sub Map is directed, such as station ID, connection identifier (CID), CID Mask (identifying one or more CIDs), etc.

According to an example embodiment, an information element (referred to herein as a Next Sub Map Pointer, or NSP) may be provided in the previous MAP in a link list manner, instead of providing one or all of the Map pointers in the Common MAP. This pointer (or NSP) may include, for example, but is not limited to: pointer to next Sub Map, encoding type (blind detection or non-blind detection), length, number of IEs, MCS, and/or IE type (HARQ or non-HARQ). The NSP could be encoded as a MAP IE.

Each Sub MAP could be encoded irrespective of their uniform/non-uniform size. For example, when the Map IEs in the subsequent sub Map or MAP are of uniform size, the NSP in the previous Map (or Sub Map) may set or identify the encoding type to be uniform size, and include the length of the entire MAP; or number of IEs included, the MCS used to encode the MAP, as well as the IE type (which may be used to determine the size and structure of each IE). The NSP may be protected with its own CRC. This scheme may provide improved spectrum efficiency, capability to perform power control for each Map IE, and better reliability since the MS or wireless station can still decode the subsequent Map IEs if one MAP IE gets corrupted.

When non uniform size is used, MAP IEs can have different sizes. The Type of each MAP IE indicates the size and structure of each MAP IE. The Next_Submap Pointer in the previous MAP set the encoding type to be non uniform size, include the length of the entire MAP, and the MCS used to encode the MAP. The MCS may not be needed if blind detection of the entire Sub map is used (i.e., the MS try to decode the entire MAP with different MCS and verify it use the CRC). This scheme provides better flexibility on MAP design since different IEs can have different structure and size and saves MS processing power.

Both of the encoding schemes above have advantages and may be used for different cases. By combining them together provides the system with optimum spectrum efficiency and flexibility.

In addition, CIDMASK may be transmitted in NSP IE to provide information about which MS should read the following Sub MAPs. The CIDMASK in each NSP IE may vary from each other, since it only indicates which MS needs to read its own subsequent Sub MAPs, for example.

According to an example embodiment, a method may include transmitting, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer that includes location information identifying a location of the next Map within a frame.

According to an example embodiment, an apparatus may include a controller; and a wireless transceiver coupled to the controller. The wireless transceiver may be configured to transmit, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer that includes location information identifying a location of the next Map within a frame.

According to an example embodiment, an apparatus may include a controller; and a wireless transceiver coupled to the controller. The wireless transceiver may be configured to transmit, to one or more wireless stations in a wireless network, map information identifying resources allocated to one or more of the wireless stations, the map information including a first Map and a plurality of sub Maps, the first Map and each Sub Map allocating resources to one or more of the wireless stations, the first Map and one or more of the Sub Maps including a Next Sub Map Pointer, the Next Sub Map Pointers being provided as a linked list, each Next Sub Map Pointer including location information identifying a location of the next Sub Map within a frame, a modulation rate and coding scheme (MCS) for the next Sub Map, and information identifying a connection or wireless station for which resources will be allocated in the Next sub Map.

According to another example embodiment, separate coding may be used for each Map or sub Map, with each Map being transmitted to a wireless station. Each Map or Sub Map may be transmitted using a variable or selected MCS (referred to herein as the Map MCS), e.g., based on the channel conditions for that wireless station. The data transmitted to each wireless station may also be encoded using a station-specific MCS, and this data MCS is typically included or specified (at least in some cases) in the Map or Sub Map. Thus, the MCS used to encode/modulate a data burst (referred to herein as the data MCS) may be included in the Map that points to the data burst.

However, according to an example embodiment, a technique is provided in which the data MCS may be omitted from a Map or Sub Map, thereby saving bandwidth or resources. For example, a receiving wireless station may perform blind decoding/detecting, by attempting to decode the received Sub Map using several different MCSs, and a CRC may be calculated each time, and compared to an attached CRC. For example, a match between calculated CRC and attached CRC may identify the correct MCS, e.g., may indicate that the Sub Map was decoded (correctly) using the Map MCS that was used by the transmitter to modulate/encode the Sub Map or Map. For example, the BS may typically have already determined an optimum or desired MCS that should be used for transmission to the wireless station. Thus, once the Map MCS is known (either from DIUC or other code in the NSP or Map, or from blind decoding/detecting to determine the Map MCS), then the data pointed to by the Map/Sub Map) may be transmitted (and decoded/demodulated) using a data MCS that is the same as the Map MCS (e.g., since the BS has already determined an optimum MCS for this wireless station).

According to another example embodiment, a Map MCS may be used that is different from the data MCS, and still avoid transmitting the data MCS in the Map or Sub Map, for example. For example, the Map may not include the data MCS, and a wireless station may determine the data MCS based on the Map MCS and a MCS differential. A MCS differential may indicate a difference or differential between a data MCS and a corresponding data MCS (data to which the Map or Sub map points). For example, if there are 16 different MCS values identified by MCS codes from 0 to 15, decreasing in robustness, for example. A MCS differential may be a 1 or 2 bit value (e.g., indicating an increase or decrease of the data MCS from the Map MCS) along this chart of 16 different MCS values. The 16 MCS values, is merely an example.

The MCS differential may be included (or transmitted within) in the Map or Sub Map, or may be communicated by the BS to the wireless station, e.g., at network entry, or via an update message, control message, management message, etc. If included within the Map or Sub Map, this MCS differential may be a smaller value (e.g., 1 or 2 bits) than the usual data MCS value (e.g., 4 bits), thereby still saving bandwidth.

For example, when separate coding is used for the Map, the MCS to encode the data may often or typically be included in the Map IE. The following example techniques may be applied to save bandwidth. Other techniques may be applied as well.

1) Removing the MCS for separate coding: The Map may carry or include the MCS for the burst (data MCS) pointed by the Map or Sub Map. In separate encoding, MAPs may typically be transmitted unicast to the individual MS according to MS's radio condition to achieve optimal spectral efficiency, for example. Since MCS for transmitting Map (Map MCS) is already optimal, there is no reason to transmit data burst with a different MCS, especially for non HARQ burst, for example. Therefore, in an example embodiment, the Map may be transmitted using a same MCS as the data burst. This may therefore remove the need for sending the data MCS in the Map, for example.

2) Differential MCS for separate coding: For some type of traffic like HARQ or other traffic (as an example), it may be desirable to send the Map or Sub Map with a more robust MCS than the burst itself. In this case, the same MCS cannot be used for Map and data burst. However, the difference between the Map MCS and data MCS for data burst may typically be small (slight deviation, for example). MAP is already transmitted with optimal MCS for individual MS, therefore fewer bits are required in the MAP to indicate the differential MCS of the data burst. If MS receives unicast MAP transmitted with MCSx (irrespective of whether MCS of MAP is blindly detected on indicated using signaling e.g., in common MAP, and differential MCS for the data inside the unicast MAP is MCSy then MCS used for transmitting data is MCSx+(−)MCSy depending upon how the MCS values are ordered (most robust to least robust or vice versa).

3) Constant MCS difference for separate coding: This is a further refinement of idea 2) above. Instead of sending the MCS differential for the data burst in a Map or Sub Map, a constant MCS differential from the Map MCS is applied in the decoding of the data burst (to determine the data MCS). The constant difference may be changed with the signaling messages on a frame or multi-frame basis, e.g., between the BS and wireless station.

According to another example embodiment, a method may include receiving a Map indicating an allocation of resources to a wireless station, decoding the received Map, determining a physical transmission mode for the Map based on the decoding of the Map, receiving data via the allocated resources as indicated by the decoded Map, decoding and/or demodulating the received data using a same physical transmission mode used to decode the received Map, wherein the same physical transmission mode is used to transmit both the Map and the received data.

According to another example embodiment, an apparatus may include a controller and a wireless transceiver. The apparatus may be configured to receive a Map indicating an allocation of resources to a wireless station, decode the received Map, determine a physical transmission mode for the Map based on the decoding of the Map, receive data via the allocated resources as indicated by the decoded Map, and decode and/or demodulate the received data using a same physical transmission mode used to decode the received Map, wherein the same physical transmission mode is used to transmit both the Map and the received data.

A method may include receiving a Map indicating an allocation of resources to a wireless station, performing a blind decoding the received Map, determining a modulation rate and/or coding scheme that was used for transmission of the Map based on the performing the blind decoding of the Map, receiving data via the allocated resources as indicated by the decoded Map, and decoding and/or demodulating the received data based on the same modulation rate and/or coding scheme that was used for transmission of the Map.

A method may include receiving a Map indicating an allocation of resources to a wireless station, the Map including a MCS (modulation rate and/or coding scheme) differential, decoding the received Map, determining a Map MCS that was used for transmission of the Map based on the decoding of the Map, receiving data via the allocated resources as indicated by the decoded Map, determining a data MCS for decoding and/or demodulating the received data based on the Map MCS and the MCS differential; and decoding and/or demodulating the received data using the data MCS.

According to another example embodiment, a method may include determining a MCS (modulation rate and/or coding scheme) differential; receiving a Map indicating an allocation of resources to a wireless station, decoding the received Map; determining a Map MCS that was used for transmission of the Map based on the decoding of the Map; receiving data via the allocated resources as indicated by the decoded Map; determining a data MCS for decoding and/or demodulating the received data based on the Map MCS and the MCS differential; and decoding and/or demodulating the received data using the data MCS.

According to another example embodiment, an apparatus may include a controller and a wireless transceiver. The apparatus may be configured to receive a Map indicating an allocation of resources to a wireless station, the Map including a MCS (modulation rate and/or coding scheme) differential; decode the received Map; determining a Map MCS that was used for transmission of the Map based on the decoding of the Map; receive data via the allocated resources as indicated by the decoded Map; determine a data MCS for decoding and/or demodulating the received data based on the Map MCS and the MCS differential; and decode and/or demodulate the received data using the data MCS.

According to another example embodiment, an apparatus may include a controller and a wireless transceiver. The apparatus may be configured to determine a MCS (modulation rate and/or coding scheme) differential; receive a Map indicating an allocation of resources to a wireless station, decode the received Map; determine a Map MCS that was used for transmission of the Map based on the decoding of the Map; receive data via the allocated resources as indicated by the decoded Map; determine a data MCS for decoding and/or demodulating the received data based on the Map MCS and the MCS differential; and decode and/or demodulate the received data using the data MCS.

Figure 3:
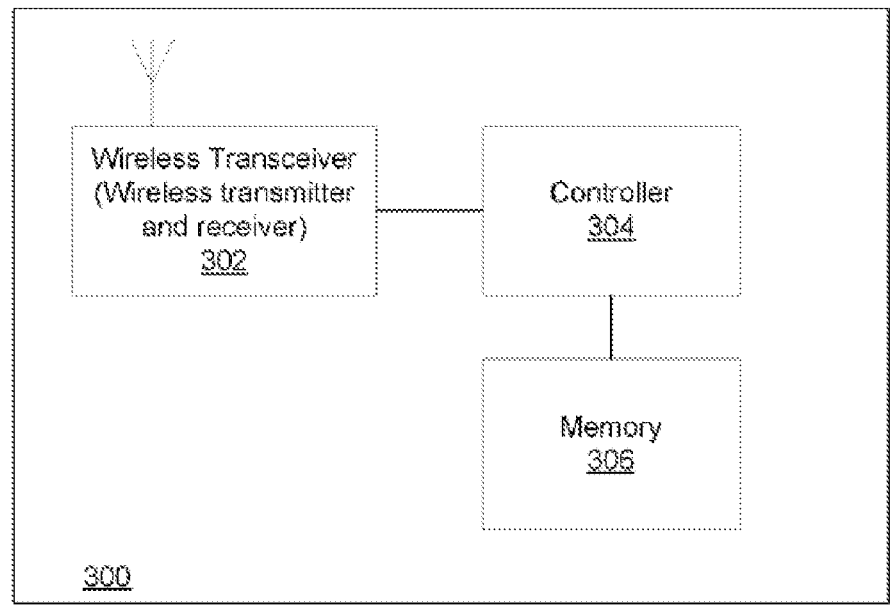
FIG. 3 is a block diagram of a wireless node according to an example embodiment.

FIG. 3 is a block diagram of a wireless station (or wireless node) 300 according to an example embodiment. The wireless station 300 (e.g. base station 104 or mobile node 106, 108, 110) may include, for example, a wireless transceiver (or wireless interface) 302, including a transmitter to transmit signals and a receiver to receive signals, a controller 304 to control operation of the station and execute instructions or software, and a memory 306 to store data and/or instructions. Controller 304 may also make decisions or determinations, generate frames or messages for transmission, decode received frames or messages for further processing, and other tasks or functions described herein.

Controller 304 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 304, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:

transmitting, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer (NSP) that includes location information identifying a location of the next Map within a frame, wherein each Next Map Pointer (NSP) further includes one or more fields including:

a downlink interval usage code identifying burst profile or physical transmission mode for the next Map;

an encoding type indicating an encoding type of a plurality of encoding types for the next Map, the plurality of encoding types including blind detection and non-blind detection;

a length or total number of information elements for the Next Map Pointer (NSP); and a connection identifier mask identifying one or more connections to which the next Map will be directed.

2. The method of claim 1 wherein the Next Map Pointers (NSP) are provided as a linked list, with each Next Map pointer (NSP) including information that points to or identifies a location of the next Map within a frame, the Maps being provided as a sequence of Maps in the frame.

3. The method of claim 1 wherein each of the Maps, except a last Map within the map information, includes a Next Map Pointer (NSP) identifying a location of the next Map within a frame.

4. The method of claim 1 wherein the plurality of Maps include a first Map and a plurality of Sub Maps, wherein the first Map and each Sub Map, except a last Sub Map, includes a Next Sub Map Pointer (NSP) that includes location information identifying a location of the next Sub Map within a frame.

5. The method of claim 1 wherein the location information comprises a symbol offset and identifying a location of the next Map within a frame and a length or number of symbols for the next Map.

6. The method of claim 1 wherein each Next Map Pointer (NSP) includes:
Next Map location information identifying a location of the Next Map within a frame;
length information identifying a length of the Next Map;
information identifying a connection or wireless station for which resources will be allocated in the Next Map; and
information identifying a physical transmission mode for the transmission of the Next Map.

7. The method of claim 1 wherein each Next Map Pointer (NSP) further includes one or more connection identifiers or a connection identifier mask identifying one or more connections for which resources will be allocated in the Next Map.

8. The method of claim 1 wherein each Next Map Pointer (NSP) further includes a coding type indicating blind detection or non-blind detection for the Next Map.

9. The method of claim 1 wherein each of the Maps indicates an allocation of uplink and/or downlink transmission resources to one or more mobile stations or connection identifiers.

10. The method of claim 1 wherein each of the Next Map Pointers (NSP) further includes at least a field identifying a physical transmission mode including a modulation rate and coding scheme used for transmission of the next Map.

11. The method of claim 1 wherein each of the Next Map Pointers (NSP) further includes at least a first field, the first field including a downlink interval usage code identifying a burst profile used for transmission of the next Map.

12. A method comprising:
transmitting, to one or more wireless stations in a wireless network,
map information identifying resources allocated to one or more of the wireless stations, the map information including a plurality of Maps, each Map allocating resources to one or more of the wireless stations, one or more of the Maps including a Next Map Pointer (NSP) that includes location information identifying a location of the next Map within a frame,
wherein the transmitting comprises:
transmitting, to one or more wireless stations in a wireless network,
map information identifying resources allocated to one or more of the wireless stations, the map information including a first Map and a plurality of sub Maps, the first Map and each Sub Map allocating resources to one or more of the wireless stations, the first Map and one or more of the Sub Maps including a Next Sub Map Pointer (NSP), the Next Sub Map Pointers (NSP) being provided as a linked list, each Next Sub Map Pointer (NSP) including location information identifying a location of the next Sub Map within a frame, a modulation rate and coding Scheme (MCS, MCS 1, MCS 2) for the next Sub Map, and information identifying a connection or wireless station for which resources will be allocated in the Next sub Map.

13. The method of claim 12 wherein each Next Map Pointer (NSP) further includes one or more fields including:
a downlink interval usage code identifying a burst profile or physical transmission mode for the next Map;
an encoding type indicating an encoding type of a plurality of encoding types for the next Map, the plurality of encoding types including blind detection and non-blind detection;
a length or total number of information elements for the Next Map Pointer (NSP); and
a connection identifier mask identifying one or more connections to which the next Map will be directed.

14. An apparatus comprising:
a controller; and
a wireless transmitter coupled to the controller, the wireless transmitter configured to transmit, to one or more wireless stations in a wireless network, map information identifying resources allocated to one or more of the wireless stations, the map information including a plurality of Maps, each Map allocating resources to one or more of the wireless stations, one or more of the Maps including a Next Map Pointer (NSP) that includes location information identifying a location of the next Map within a frame, wherein each Next Map Pointer (NSP) further includes one or more fields including:
a downlink interval usage code identifying a burst profile or physical transmission mode for the next Map;
an encoding type indicating an encoding type of a plurality of encoding types for the next Map, the plurality of encoding types including blind detection and non-blind detection;
a length or number of information elements for the Next Map Pointer (NSP); and
a connection identifier mask identifying one or more connections to which the next Map will be directed.

15. An apparatus according claim 14 wherein the Maps further including, a modulation rate and coding scheme (MCS) for the next Map, and information identifying a connection or wireless station for which resources will be allocated in the Next Map.

16. A method comprising:
receiving a Map indicating an allocation of resources to a wireless station;
decoding the received Map;
determining a physical transmission mode for the Map based on the decoding of the Map; receiving data via the allocated resources as indicated by the decoded Map;
decoding and/or demodulating the received data using a same physical transmission mode used to decode the received Map, wherein the same physical transmission mode is used to transmit both the Map and the received data.

17. The method of claim 16 wherein the physical transmission mode for the Map comprises a modulation rate and coding scheme used to transmit the Map, wherein the decoding and/or demodulating includes decoding and/or demodulating the received data using the same modulation rate and/or coding scheme used to decode and/or demodulate the received Map, and further wherein the received Map does not explicitly identify modulation rate and/or coding scheme used to transmit the received data.

18. The method of claim 16 wherein the decoding the received Map comprises performing blind decoding of the received Map using one or more physical transmission modes, until the Map is successfully decoded using the physical transmission mode that was used to transmit the Map; and
wherein the determining the physical transmission mode for the Map comprises determining the physical transmission mode that was used to successfully decode the Map, and wherein the same physical transmission mode is used to transmit the received data via the allocated resources.

19. The method of claim 16 wherein the physical transmission mode is used for physical transmission of both the Map and the received data.

20. The method of claim 16 wherein the physical transmission mode comprises one of a plurality of physical transmission modes, each physical transmission mode including a modulation rate and/or coding scheme.

21. An apparatus comprising:
a controller; and
a wireless transmitter coupled to the controller, the apparatus configured to:
receive a Map indicating an allocation of resources to a wireless station;
decode the received Map;
determine a physical transmission mode for the Map based on the decoding of the Map;
receive data via the allocated resources as indicated by the decoded Map; and
decode and/or demodulate the received data using a same physical transmission mode used to decode the received Map, wherein the same physical transmission mode is used to transmit both the Map and the received data.

22. A method comprising:
receiving a Map indicating an allocation of resources to a wireless station;
performing a blind decoding the received Map;
determining a modulation rate and/or coding scheme that was used for transmission of the Map based on the performing the blind decoding of the Map;
receiving data via the allocated resources as indicated by the decoded Map;
decoding and/or demodulating the received data based on the same modulation rate and/or coding scheme that was used for transmission of the Map.

23. A method comprising:
receiving a Map indicating an allocation of resources to a wireless station, the Map including a modulation rate and/or coding scheme differential;
decoding the received Map;
determining a Map modulation rate and/or coding scheme that was used for transmission of the Map based on the decoding of the Map;
receiving data via the allocated resources as indicated by the decoded Map;
determining a data modulation rate and/or coding scheme for decoding and/or demodulating the received data based on the Map modulation rate and/or coding scheme and the modulation rate and/or coding scheme differential; and
decoding and/or demodulating the received data using the data modulation rate and/or coding scheme.

24. A method comprising:
determining a modulation rate and/or coding scheme differential;
receiving a Map indicating an allocation of resources to a wireless station,
decoding the received Map;
determining a Map modulation rate and/or coding scheme that was used for transmission of the Map based on the decoding of the Map;
receiving data via the allocated resources as indicated by the decoded Map;
determining a data MCS for decoding and/or demodulating the received data based on the Map modulation rate and/or coding scheme and the modulation rate and/or coding scheme differential; and
decoding and/or demodulating the received data using the data modulation rate and/or coding scheme.

25. The method of claim 24 wherein the determining the modulation rate and/or coding scheme differential comprises at least one of:
receiving a control message or management message from a base station or other infrastructure node identifying the modulation rate and/or coding scheme differential;
receiving the Map, the Map including the modulation rate and/or coding scheme differential;
retrieving the modulation rate and/or coding scheme differential that is stored in a memory.

26. An apparatus comprising:
a controller; and
a wireless transmitter coupled to the controller, the apparatus configured to:
receive a Map indicating an allocation of resources to a wireless station, the Map including a modulation rate and/or coding scheme differential;
decode the received Map;
determining a Map modulation rate and/or coding scheme that was used for transmission of the Map based on the decoding of the Map;
receive data via the allocated resources as indicated by the decoded Map;
determine a data modulation rate and/or coding scheme for decoding and/or demodulating the received data based on the Map modulation rate and/or coding scheme and the modulation rate and/or coding scheme differential; and
decode and/or demodulate the received data using the data modulation rate and/or coding scheme.

27. An apparatus comprising:
a controller; and
a wireless transmitter coupled to the controller, the apparatus configured to:
determine a modulation rate and/or coding scheme differential;
receive a Map indicating an allocation of resources to a wireless station,
decoding the received Map;
determine a Map modulation rate and/or coding scheme that was used for transmission of the Map based on the decoding of the Map;
receive data via the allocated resources as indicated by the decoded Map;
determine a data modulation rate and/or coding scheme for decoding and/or demodulating the received data based on the Map modulation rate and/or coding scheme and the modulation rate and/or coding scheme differential; and
decode and/or demodulate the received data using the data modulation rate and/or coding scheme.

* * * * *

UNITED STATES PATENT AND TRADEMARK OFFICE
CERTIFICATE OF CORRECTION

PATENT NO. : 8,483,160 B2
APPLICATION NO. : 12/989088
DATED : July 9, 2013
INVENTOR(S) : Shashikant Maheshwari et al.

It is certified that error appears in the above-identified patent and that said Letters Patent is hereby corrected as shown below:

In the Claims

In Claim 1:
Column 10, line 60, --a-- should be inserted after "identifying".

In Claim 14:
Column 12, line 41, --total-- should be inserted before "number".

Signed and Sealed this
Seventeenth Day of September, 2013

Teresa Stanek Rea
*Deputy Director of the United States Patent and Trademark Office*